Dec. 24, 1968
A. G. BODINE
3,417,966
ADJUSTMENT OF ORBITING MASS OSCILLATOR DRIVING RESONANT SONIC
VIBRATION SYSTEM FOR OPTIMUM SYSTEM STABILITY
Filed Jan. 3, 1967
3 Sheets-Sheet 1
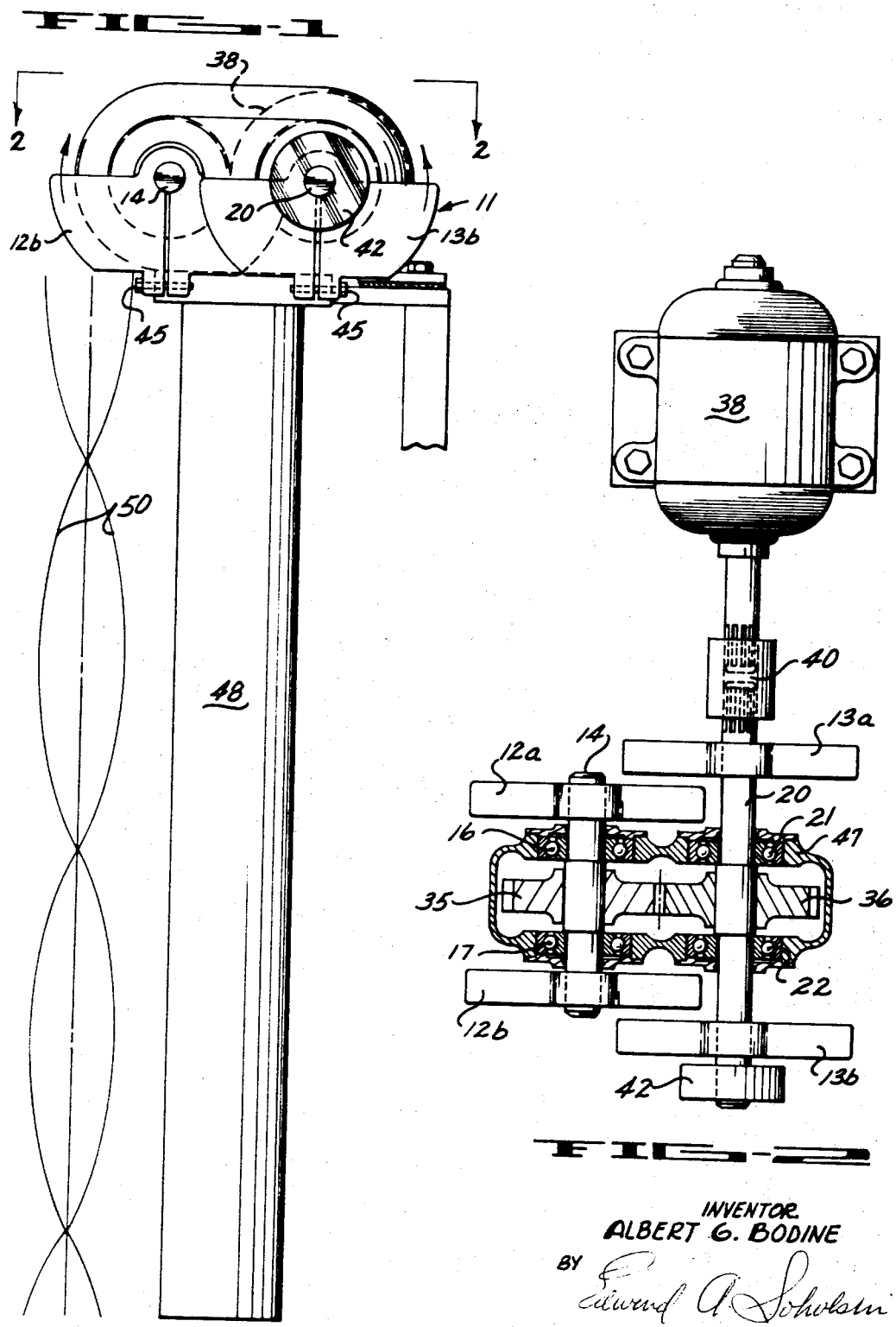
INVENTOR.
ALBERT G. BODINE
BY
Edward A. Sohulein
ATTORNEY Dec. 24, 1968 A. G. BODINE 3,417,966
ADJUSTMENT OF ORBITING MASS OSCILLATOR DRIVING RESONANT SONIC
VIBRATION SYSTEM FOR OPTIMUM SYSTEM STABILITY
Filed Jan. 3, 1967 3 Sheets-Sheet 2
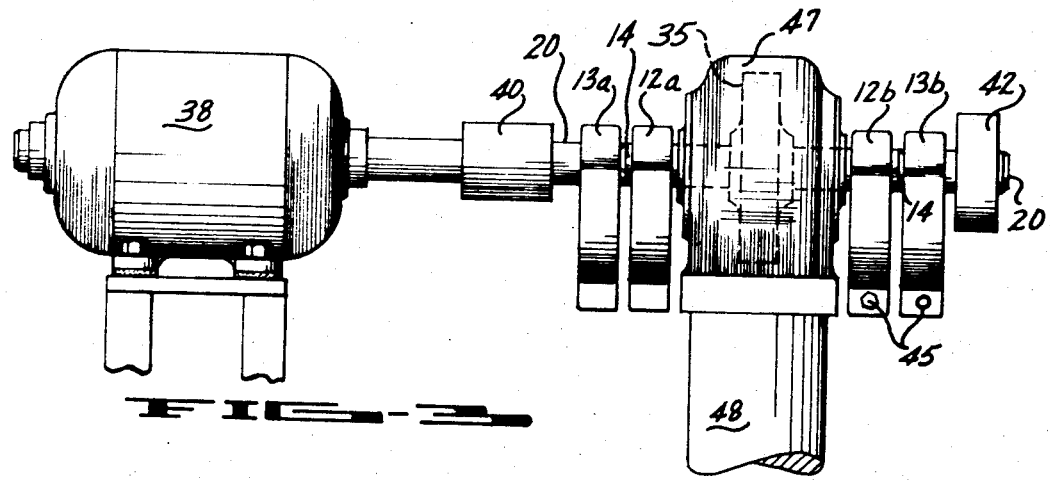
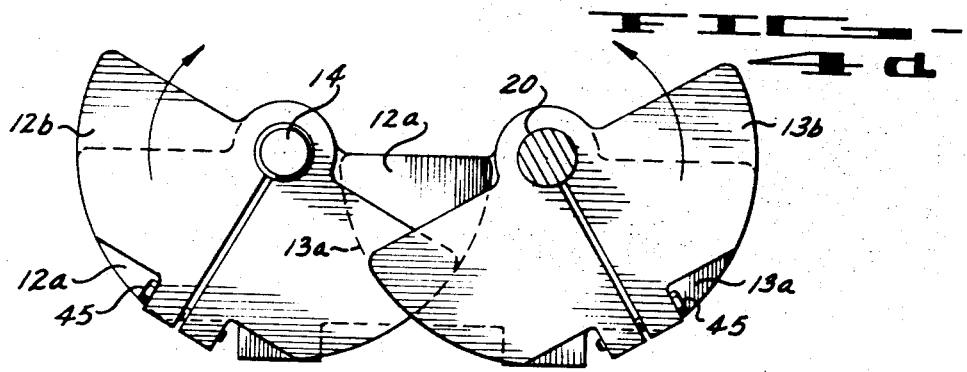
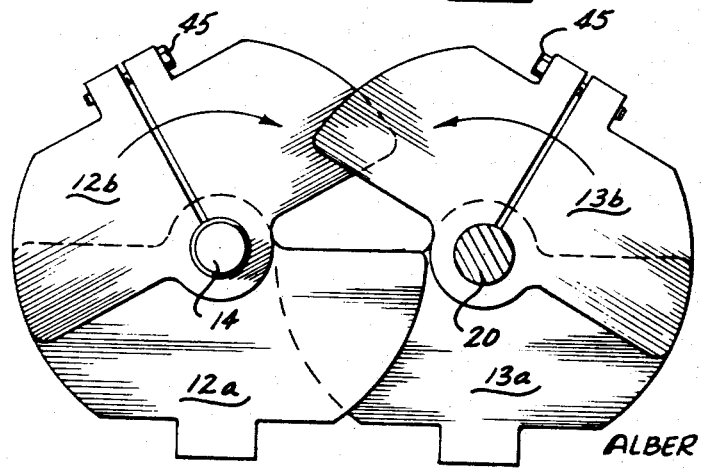
INVENTOR.
ALBERT G. BODINE
BY
ATTORNEY Dec. 24, 1968    A. G. BODINE    3,417,966
ADJUSTMENT OF ORBITING MASS OSCILLATOR DRIVING RESONANT SONIC
VIBRATION SYSTEM FOR OPTIMUM SYSTEM STABILITY
Filed Jan. 3, 1967    3 Sheets-Sheet 3
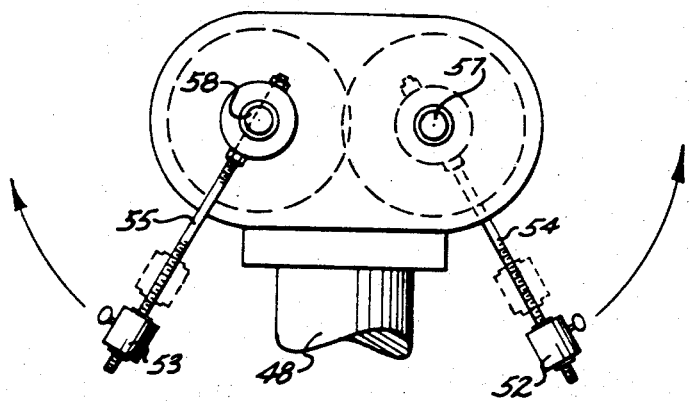
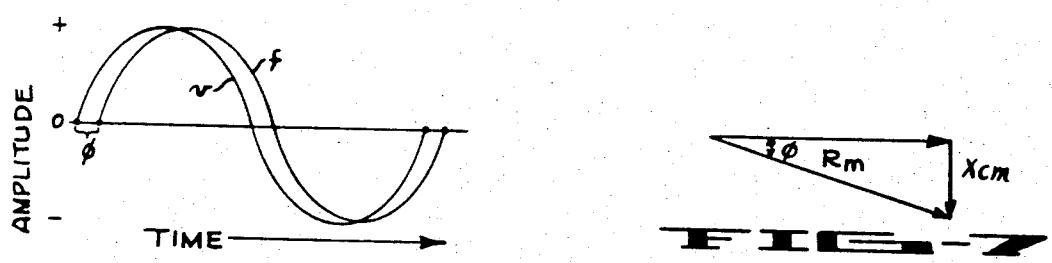
INVENTOR.
ALBERT G. BODINE
BY
ATTORNEY

United States Patent Office 3,417,966
Patented Dec. 24, 1968

3,417,966
ADJUSTMENT OF ORBITING MASS OSCILLATOR DRIVING RESONANT SONIC VIBRATION SYSTEM FOR OPTIMUM SYSTEM STABILITY
Albert G. Bodine, 7877 Woodley Ave., Van Nuys, Calif. 91406
Continuation-in-part of application Ser. No. 402,529, Oct. 8, 1964. This application Jan. 3, 1967, Ser. No. 606,742
4 Claims. (Cl. 259—1)

ABSTRACT OF THE DISCLOSURE

The degree of effective mass unbalance of an orbiting mass oscillator utilized to drive an elastic vibration system is adjusted to provide optimum stability of the vibration system. The oscillator is operated to have its output at a frequency slightly below resonance, so that the vibration system exhibits compliance reactance characteristics. Under such conditions the force vector lags the velocity vector by an angle of between 0 and 90°. The mass unbalance of the rotor is then adjusted for the particular load and power input conditions at hand to provide an optimum output whereby the phase angle by which the force vector lags the velocity vector, and the amplitude of vibration of the vibrational members make for optimum stability of operation.

This application is a continuation-in-part of my application Ser. No. 402,529, filed Oct. 8, 1964, now Patent No. 3,295,837.

This invention relates to orbiting mass oscillators for driving resonant sonic vibration systems, and more particularly to a technique for improving the stability of operation of such systems by the adjustment of the rotor members of such an oscillator to provide an optimum phase angle between the force and velocity vectors of the output thereof.

In the aforementioned application Ser. No. 402,529, of which this application is a continuation in part, a technique is described for improving the stability of a sonic resonant vibration system driven by an orbiting mass oscillator by utilizing a plurality of rotor members which are driven at a speed such as to have a vibration output at a frequency slightly below the natural resonant frequency of the elastic vibration member being driven. Such below resonance operation, as noted, provides a phase relationship between the force and velocity vectors so as to engender highly stable operation. The technique of this invention provides means for closely adjusting this phase relationship in view of the particular operation conditions encountered so as to optimize stability of operation in conjunction with other desirable operating characteristics.

The technique of this invention is concerned with orbiting mass oscillators utilizing rotors which are driven in orbital paths outside of the surfaces of their cylindrical support bearings which might be termed "swinging weight oscillators." Such bearings are coupled to an elastic vibration system to transfer the vibrational output of the associated oscillator to such system. The oscillator rotor members are driven at a rotation speed such as to generate elastic vibrations at a frequency which is slightly below the natural resonant frequency of the vibration system so that such vibration system exhibits compliance reactance characteristics. The oscillator rotor members in the illustrative examples are adapted to be adjustably positioned so that the effective mass unbalance thereof can be changed over a relatively wide range of adjustment. The mass unbalance and its lever arm are adjusted to produce an optimum force output consistent with high stability for each given operational situation with the following basic considerations governing:

(1) The Q of the vibration system should be greater than 4;
(2) The force vector of the vibration should lag the velocity vector by an angle of less than 90°;
(3) The effective radius of the orbiting mass of the oscillator rotor should be at least five times greater than the amplitude of vibration of the vibration system in the region where the oscillator is acoustically coupled to the vibration system.

While the technique of this invention is described in connection with oscillators having rotors whose mass unbalance can be adjusted in the field, this same technique can be used to equal advantage in the design of an oscillator having a pre-set rotor mass unbalance for use with a vibration system having known characteristics.

It is to be noted that as the amplitude of the vibrational output of the orbiting mass oscillator is changed by adjusting the effective mass unbalance of the rotor thereof, that for a given average input power, the phase angle between the force and velocity vectors correspondingly changes. Obviously, also, the effective radius of the orbiting mass is changed with such adjustment. Thus two of the three critical factors enumerated above are interrelatedly affected by the rotor adjustment utilized in carrying out the method of this invention, with such adjustment being made to satisfy the above enumerated criteria to the maximum extent possible.

It is therefore an object of this invention to provide means for improving the stability of operation of vibration systems driven by orbiting mass oscillators.

It is a further object of this invention to provide a method for adjusting the phase angle between the force and velocity vectors of an elastic vibration system by adjustment of the mass unbalance of the rotor or rotors of an orbiting mass oscillator driving such system.

It is still another object of this invention to provide a simple technique for in-the-field adjustment of an orbiting mass oscillator to provide optimum stability of operation with each particular vibration system with which it is operated.

Other objects of this invention will become apparent from the following description taken in connection with the accompanying drawings of which:

FIG. 1 is an end elevational view illustrating the utilization of the method of the invention with a first type of swinging weight oscillator, FIG. 2 is a view taken along the plane indicated by 2—2 in FIG. 1, FIG. 3 is a side elevational view of the device of FIGS. 1 and 2, FIGS. 4a and 4b are schematic views illustrating the adjustment of the rotors of the device of FIGS. 1–3, FIG. 5 is a schematic view illustrating the utilization of the method of the invention with a second type of swinging weight oscillator, and FIGS. 6 and 7 are schematic drawings illustrating the phase angle maintained between the velocity and force vectors in the method of this invention.

It has been found most helpful in analyzing the operation of the method of this invention to analogize the acoustically vibrating circuit involved to an equivalent electrical circuit. This sort of approach to analysis is well known to those skilled in the art and is described, for example, in Chapter 2 of Sonics by Hueter and Bolt, published in 1955 by John Wiley and Sons. In making such an analogy, force F is equated with electrical voltage E; velocity of vibration $u$ is equated with electrical current $i$; mechanical compliance $C_m$ is equated with electrical capacitance $C_e$; mass M is equated with electrical inductance L; mechanical resistance $R_m$ is equated with electrical resistance R; and mechanical impedance $Z_m$ is equated with electrical impedance $Z_e$.

Thus, it can be shown that if a member is elastically vibrated by means of an acoustical sinusoidal force $F_o \sin \omega t$ ($\omega$ being equal to $2\pi$ times the frequency of vibration) that $$Z_m = R_m + j\left(\omega M - \frac{1}{\omega C_m}\right) = F_o \sin \omega t \quad (1)$$

Where $\omega M$ is equal to $1/\omega C_m$, a resonant condition exists, and the effective mechanical impedance $Z_m$, is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is most efficiently delivered to a load to which the resonant system may be coupled.

It is also important to note the significance of the attainment of high acoustical Q in the resonant system being driven, to increase the efficiency of the vibration thereof and to provide a maximum amount of energy for the vibration system. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$.

Referring now to FIGS. 1-4, the application of the method of the invention to a first type of orbiting mass oscillator is illustrated. The oscillator 11 comprises a first pair of eccentric rotor members 12a and 12b and a second pair of eccentric rotor members 13a and 13b. Rotor members 12a and 12b are attached to opposite ends of shaft 14 which is rotatably supported on ball bearings 16 and 17. Rotor members 13a and 13b are attached to shaft 20 which is rotatably supported on bearings 21 and 22. Gear members 35 and 36 are attached to shafts 14 and 20 respectively, the gear teeth of these two gear members being intermeshed to form a gear train. Shaft 20 is rotatably driven by means of motor 38, the drive shaft of which is coupled to shaft 20 by means of splined coupler 40. Rotor members 13a and 13b are thus rotatably driven by means of motor 38 in opposite directions to rotor members 12a and 12b by virtue of the coupling between gear members 35 and 36. A balance weight member 42 is attached to the end of shaft 20 to counterbalance the weighting effects occasioned by the coupling to the output shaft of motor 38.

Rotor members 12b and 13b differ from the rotor members 12a and 13a in that they utilize a split construction having two half pieces which can be separated somewhat from each other or drawn closer towards each other by means of adjustment bolts 45 which threadably engage the rotor half sections. Thus, rotor members 12b and 13b can be loosened from shafts 14 and 20 respectively and set into any desired position about the rotation axes of such shafts. Rotor members 12a and 13a on the other hand are permanently set into position on shafts 14 and 20. Rotor support bearings 16, 17, 21 and 22 are mounted in housing 47, housing 47 being attached to elastic vibration member 48. Vibration member 48 may, for example, comprise a steel casing which is to be driven into the ground by virtue of the sonic energy coupled thereto such as described in my Patent No. 2,975,846.

Rotor members 12a, 12b, 13a and 13b form swinging weights which are driven outside of the support bearings by means of motor 38 to generate elastic vibrational energy by virtue of their mass unbalance. This vibrational energy is coupled from the rotor member support bearings to elastic vibration member 48. In view of the arrangement and opposite rotation of rotor members 12a, 12b and 13a, 13b, vibrational energy transverse to the longitudinal axis of vibration member 48 is effectively cancelled out with vibrational energy being transferred to this member only along its longitudinal axis. With the vibrational output of oscillator 11 at or near the resonant vibration frequency of the vibration system including vibration member 48, high amplitude standing wave vibration as indicated by graph lines 50 is production.

In carrying out the method of the invention, motor 38 first is brought to a speed which produces a vibrational output from oscillator 11 right at the resonant frequency of the vibration system. Such resonance is indicated by a peak in the amplitude of the resonant vibration of vibration member 48. The speed of rotation of motor 38 is then lowered slightly to bring the oscillator vibrational output to a frequency just below the peak resonant frequency. Under such operating conditions, the force vector of the vibrational output will lag the velocity vector as indicated in FIG. 6, the graph line $f$ representing the sinusoidal variation of the force vector, the graph line $v$ indicating the sinusoidal variation of the velocity vector. The angle indicated as $\phi$ represents the angle by which the force vector lags the velocity vector. The lag angle $\phi$ is adjusted for optimum vibrational output consistent with high stability of operation by rotatably positioning rotor elements 12b and 13b, relative to their paired opposites 12a and 13a respectively. It is to be noted that in making such an adjustment that rotor members 12b and 13b should be rotatably displaced equally to assure that transverse vibrational components are cancelled out when the paired rotor members are driven in opposite directions.

Referring now to FIGS. 4a and 4b, two different positionings of rotor members 12b and 13b are shown for illustrative purposes. With these rotor members positioned as shown in FIG. 4a, the lag angle $\phi$ is relatively small as compared to what it is with the rotor members positioned as indicated in FIG. 4b. FIG. 7 is a vectorial representation of the lag angle $\phi$. As can be seen from this figure, $\phi$ is a function of the ratio between the compliance reactance, $X_{cm}$, and the mechanical resistance, $R_m$, of the system. The angle $\phi$ is also indicative of the power factor of the system which represents the relationship between real and reactive power. With rotor members 12b and 13b positioned relative to rotor members 12a and 13a, as indicated in FIG. 4a, the mass unbalance is relatively high, providing a relatively high force output, and angle $\phi$ is relatively low with a correspondingly high power factor. With rotor members 12b and 13b positioned as indicated in FIG. 4b, the total effective mass unbalance of the oscillator is relatively small resulting in a high lag angle $\phi$ with a relatively low vibrational output and power factor as compared with the position of FIG. 4a. Rotor members 12b and 13b thus can be adjusted to produce a desired force output to a particular vibration system consistent with stable operation of such system. It is to be noted that in operative systems with which the technique of this invention has been utilized, the vibration frequencies utilized are of the order of 30–200 cycles.

The optimum selection of the phase angle $\phi$ depends not only upon the vibration member 48 but the load into which it operates. Thus loads having different types of impedance characteristics will require a different value of $\phi$ for proper impedance matching and the desired stability of operation. Once however experience has been gained with a particular type of operation situation, the required phase angle characteristics can be fairly accurately predicted in advance. In such situations proper characteristics can be built into the oscillator with on-the-spot adjustment being unnecessary. Along these lines, for example, it has been determined that for the system such as illustrated in FIG. 1, involving a vibrational member 48 which comprises a casing to be driven into earthen material, a phase angle $\phi$ of about 55° which results in a power factor (cosine $\phi$) of .8 produces optimum operation. It is to be noted that in selecting a phase angle $\phi$, that this angle should be such as to result in a vibration system Q of at least 4. Further, the rotor members should be positioned to produce a vibrational output which results in an amplitude of vibration at the rotor bearings which is less than one fifth of the effective rotor swing radius.

Referring now to FIG. 5, the utilization of the method of the invention with a second type of orbiting mass oscillator is schematically illustrated. In this type of oscillator, weight members 52 and 53 are threadably attached to lever arms 54 and 55 respectively, such lever arms being driven in opposite directions about the axes of rotation of rotatably driven shafts 57 and 58 to which they are respectively attached. Weight members 52 and 53 thus constitute swinging weights which generate vibrational energy along the longitudinal axis of vibration member 48. As for the oscillator described in connection with FIGS. 1–3, the transverse vibrational components are cancelled out by virtue of the opposite rotation of the weight members. The vibrational force output and the angle $\phi$ by which the force vector lags the velocity vector, are a function of the effective length of lever arms 54 and 55, i.e. the distance out on such lever arms that the weight members 52 and 53 are locked in position. Thus, if weight members 52 and 53 were to be repositioned at a point farther in on the lever arm as indicated by the dotted outlines thereof the angle $\phi$ would be increased and vice versa. As for the first type of oscillator, weight members 52 and 53 should both be positioned the same distance from the ends of their respective lever arms to provide effective cancellation of transverse vibrations. Thus, the second type of oscillator can be adjusted by the method of this invention in the same fashion as the first type of oscillator described to produce optimum stability for the particular operational situation encountered.

The method of this invention thus enables the operation of an orbiting mass oscillator in conjunction with a vibration system for an optimum stability consistent with the required vibrational output. This end result is achieved by operating the oscillator at a frequency slightly below the resonant peak frequency and adjusting the effective mass unbalance of the oscillator rotor so that the vibrational energy generated by the rotor has a force vector which lags the velocity vector thereof by an angle of less than 90° which produces the desired optimum operation.

While the method of this invention has been described and illustated in detail, it is to be clearly understood that this is intended by way of illustration and example only and is not to be taken by way of limitation, the spirit and scope of this invention being limited only by the terms of the following claims.

I claim:
1. A method for adjusting the energization of an elastic vibration system for optimum stability, said system including an elastic vibration member, comprising the steps of:
driving a rotor repeatedly in an orbital path outside the surface of a cylindrical support bearing, said support bearing being held in coupled relation to said vibration member, said rotor being driven at a speed such as is to transmit vibratory force through said bearing at a frequency slightly below the peak resonant vibration frequency of said vibration system, and adjusting the effective mass unbalance of said rotor so that the vibrational energy generated by said rotor has a force vector which lags the velocity vector thereof by an angle of less than 90° which provides operation near the resonant vibration peak.

2. The method as recited in claim 1 wherein the mass unbalance of said rotor is adjusted to additionally provide a vibration system Q of greater than 4.

3. The method as recited in claim 1 wherein the mass unbalance of said rotor is adjusted to additionally provide an effective orbiting path for the center of mass having a radius which is more than five times the amplitude of vibration at the rotor bearings.

4. A method for obtaining optimum stability of the operation of an elastic vibration system driven by an orbiting mass oscillator, said oscillator comprising a rotor having mass unbalance, said rotor being driven on cylindrical bearings in an orbital path outside of the surface of such bearings, said bearings being coupled to the vibration system, comprising the steps of:
adjusting the speed of rotation of said rotor to produce a vibrational output at a frequency slightly below the peak resonant frequency of said vibration system, and
adjusting the degree of mass unbalance of said rotor so that the force vector of the vibrational energy fed to said vibration system lags the velocity vector thereof by an angle of less than 90° which provides optimum stability of said system.

References Cited

UNITED STATES PATENTS

| | | | |
|---|---|---|---|
| 2,897,734 | 8/1959 | Bodine | 74—61 XR |
| 3,220,268 | 11/1965 | Brandt | 259—1 XR |
| 3,295,837 | 1/1967 | Bodine | 259—1 |

WALTER A. SCHEEL, *Primary Examiner.*

J. M. BELL, *Assistant Examiner.*

U.S. Cl. X.R.

259—72, 91; 74—61